(12) United States Patent
Nagashima

(10) Patent No.: US 7,711,827 B2
(45) Date of Patent: May 4, 2010

(54) COMMUNICATION SYSTEM, COMMUNICATION SERVER AND COMMUNICATION METHOD

(75) Inventor: Kunio Nagashima, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1156 days.

(21) Appl. No.: 11/302,369

(22) Filed: Dec. 14, 2005

(65) Prior Publication Data

US 2006/0126588 A1 Jun. 15, 2006

(30) Foreign Application Priority Data

Dec. 14, 2004 (JP) ............... 2004-361288

(51) Int. Cl.
H04J 1/16 (2006.01)
H04Q 7/24 (2006.01)
(52) U.S. Cl. .............. 709/227; 370/401; 379/900
(58) Field of Classification Search .......... 370/401; 379/900
See application file for complete search history.

(56) References Cited

U.S. PATENT DOCUMENTS

| | | | |
|---|---|---|---|
| 6,246,696 B1* | 6/2001 | Yamaguchi et al. | 370/475 |
| 6,862,626 B1* | 3/2005 | Ryu | 709/227 |
| 6,885,871 B2* | 4/2005 | Caloud | 455/466 |
| 6,912,373 B2* | 6/2005 | Lee | 455/41.2 |
| 7,301,951 B2* | 11/2007 | Chen et al. | 370/395.52 |
| 2002/0095516 A1* | 7/2002 | Nada | 709/245 |
| 2003/0008713 A1* | 1/2003 | Ushiro et al. | 463/42 |
| 2003/0208568 A1* | 11/2003 | Inoue et al. | 709/220 |
| 2003/0233468 A1* | 12/2003 | Lee | 709/236 |
| 2004/0202184 A1* | 10/2004 | Yazaki et al. | 370/395.31 |
| 2005/0058143 A1* | 3/2005 | Kikuchi et al. | 370/401 |
| 2005/0242921 A1* | 11/2005 | Zimmerman et al. | 340/5.2 |
| 2006/0029050 A1* | 2/2006 | Harris et al. | 370/356 |
| 2006/0168344 A1* | 7/2006 | Tsuchiya | 709/245 |
| 2006/0253852 A1* | 11/2006 | Honda et al. | 717/177 |
| 2007/0094303 A1* | 4/2007 | Zwingenberger et al. | 707/104.1 |

FOREIGN PATENT DOCUMENTS

| | | |
|---|---|---|
| GB | 2 408 128 | 5/2005 |
| JP | 2-276336 A | 11/1990 |
| JP | 2001-7856 A | 1/2001 |
| JP | 2002-124891 A | 4/2002 |
| JP | 2002-315078 | 10/2002 |

(Continued)

Primary Examiner—Wing F Chan
Assistant Examiner—Andrew Woo
(74) Attorney, Agent, or Firm—Sughrue Mion, PLLC

(57) ABSTRACT

A communication system comprises a first communication terminal (101) provided with an ID tag (106) and having a communication function for a first medium, a second communication terminal (102) provided with an ID reader (107) and having a communication function for a second medium different from the first medium, and a communication server (109) connected to the first and the second communication terminals. The ID tag stores terminal address information representative of an address of the first communication terminal. When the ID reader reads, as readout address information, the terminal address information from the ID tag, the second communication terminal informs the readout address information to the communication server. Supplied from the second communication terminal with the address of the first communication terminal as the readout address information, the communication server registers the first and the second communication terminals as a single communication terminal having the communication functions for the first and the second media.

30 Claims, 8 Drawing Sheets

FOREIGN PATENT DOCUMENTS

| | | |
|---|---|---|
| JP | 2004-30524 A | 1/2004 |
| JP | 2004-201276 | 7/2004 |
| JP | 2004-208053 | 7/2004 |
| JP | 2004-220421 | 8/2004 |
| WO | 03/092269 A1 | 11/2003 |
| WO | 2004/080009 A1 | 9/2004 |

* cited by examiner

COMMUNICATION SYSTEM, COMMUNICATION SERVER AND COMMUNICATION METHOD

This application claims priority to prior Japanese application JP 2004-361288, the disclosure of which is incorporated herein by reference.

BACKGROUND OF THE INVENTION

This invention relates to a multimedia communication method of handling a combination of a plurality of media such as voice and motion picture (or moving picture).

Japanese Unexamined Patent Application Publication 2002-124891 (JP-A) discloses a system for supporting information acquisition. In the system, an object is preliminarily provided with unique or specific information as RFID (Radio Frequency Identification). The unique information is read by a reader using radio communication and transmitted by a terminal device (for example, a mobile telephone) to a computer via Internet.

This invention relates to a multimedia communication method using a first communication terminal provided with an RFID tag and having a communication function for a first medium and a second communication terminal provided with an RFID reader and having a communication function for a second medium different from the first medium.

Recent development of the QoS (Quality of Service) technology makes it possible to exchange streaming information, such as voice and motion picture, via an IP (Internet Protocol) network in addition to traditional data.

On the above-mentioned background, it becomes possible to perform multimedia communication by a single IP network. That is, it is possible to share graphics information, text information, application software, and the like and to perform conversation using voice and motion picture.

At present, such a multimedia communication method is implemented by a PC (Personal Computer) and Windows (registered trademark) Messenger of Microsoft Corporation. However, there is a problem that the PC is low in portability.

On the other hand, as a highly portable communication terminal, a mobile telephone, a PDA (Personal Digital Assistant), and the like are widely used. However, due to limitation in screen size and battery life, it is not only technically difficult but also unfavorable in view of an user interface to provide a single mobile terminal or a single PDA with communication functions for various media such as the voice and the motion picture as well as sharing of the graphics information, the text information, and the application software.

SUMMARY OF THE INVENTION

It is a first object of this invention to provide a communication system, a communication server, and a communication method in which a first communication terminal having a communication function for a first medium is enabled to perform communication by a plurality of media by the use of a second communication terminal having a communication function for a second medium different from the first medium, even if the first communication terminal does not have the communication function for the second medium.

It is a second object of this invention to provide a communication system, a communication server, and a communication method in which a first communication terminal having a communication function for a first medium is enabled to perform communication by a plurality of media by the use of a second communication terminal having a communication function for a second medium different from the first medium, even if the first communication terminal does not have the communication function for the second medium, by means of an ID tag attached to or incorporated into one of the first and the second communication terminals and an ID reader attached to or incorporated into the other of the first and the second communication terminals.

Communication systems according to this invention, communication servers according to this invention, and communication methods according to this invention are as follows:

(1) A communication system comprising:

a first communication terminal provided with an ID tag and having a communication function for a first medium;

a second communication terminal provided with an ID reader and having a communication function for a second medium different from the first medium; and a communication server connected to the first and the second communication terminals;

the ID tag storing terminal address information representative of an address of the first communication terminal;

the second communication terminal informing, when the ID reader reads, as readout address information, the terminal address information from the ID tag of the first communication terminal, the readout address information to the communication server;

the communication server carrying out registration of registering the first and the second communication terminals as a single communication terminal having the communication functions for the first and the second media when the communication server is supplied from the second communication terminal with the address of the first communication terminal as the readout address information.

(2) A communication system comprising:

a first communication terminal provided with an infrared ID transmitter and having a communication function for a first medium;

a second communication terminal provided with an infrared ID receiver and having a communication function for a second medium; and a communication server connected to the first and the second communication terminals;

the infrared ID transmitter storing terminal address information representative of an address of the first communication terminal and transmitting the terminal address information by an infrared ray;

the second communication terminal informing the terminal address information to the communication server when the infrared ID receiver receives the infrared ray from the infrared ID transmitter and when the second communication terminal obtains the terminal address information;

the communication server carrying out registration of registering the first and the second communication terminals as a single communication terminal having the communication functions for the first and the second media when the communication server is supplied from the second communication terminal with the address of the first communication terminal as the terminal address information.

(3) A communication server for use in a communication system which comprises a first communication terminal provided with an ID tag and having a communication function for a first medium and a second communication terminal provided with an ID reader and having a communication function for a second medium different from the first medium, the communication server being connected to the first and the second communication terminals and having a memory, the ID tag storing terminal address information representative of an address of the first communication terminal, the second communication terminal informing, when the ID reader reads, as readout address information, the terminal address information from the ID tag of the first communication terminal, the readout address information to the communication server, wherein:

the communication server has a function of carrying out registration of registering, in the memory, the first and the second communication terminals as a single communication terminal having the communication functions for the first and the second media when the communication server is supplied from the second communication terminal with the address of the first communication terminal as the readout address information.

(4) A communication server for use in a communication system which comprises a first communication terminal provided with an infrared ID transmitter and having a communication function for a first medium and a second communication terminal provided with an infrared ID receiver and having a communication function for a second medium different from the first medium, the communication server being connected to the first and the second communication terminals, the infrared ID transmitter storing terminal address information representative of an address of the first communication terminal and transmitting the terminal address information by an infrared ray, the second communication terminal informing the terminal address information to the communication server when the infrared ID receiver receives the infrared ray from the infrared ID transmitter and when the second communication terminal obtains the terminal address information, wherein:

the communication server has a function of carrying out registration of registering the first and the second communication terminals as a single communication terminal having the communication functions for the first and the second media when the communication server is supplied from the second communication terminal with the address of the first communication terminal as the terminal address information.

(5) A communication method for use in a communication system which comprises a first communication terminal provided with an ID tag and having a communication function for a first medium, a second communication terminal provided with an ID reader and having a communication function for a second medium different from the first medium, and a communication server connected to the first and the second communication terminals, the method comprising the steps of:

preliminarily writing into the ID tag terminal address information representative of an address of the first communication terminal;

making the second communication terminal inform, when the ID reader reads as readout address information the terminal information from the ID tag of the first communication terminal, the readout address information to the communication server;

making the communication server carry out registration of registering the first and the second communication terminals as a single communication terminal having the communication functions for the first and the second media when the communication server is supplied from the second communication terminal with the address of the first communication terminal as the readout address information.

(6) A communication method for use in a communication system which comprises a first communication terminal provided with an infrared ID transmitter and having a communication function for a first medium, a second communication terminal provided with an infrared ID receiver and having a communication function for a second medium different from the first medium, and a communication server connected to the first and the second communication terminals, the method comprising the steps of:

making the infrared ID transmitter memorize terminal address information representative of an address of the first communication terminal;

making the infrared ID transmitter transmit the terminal address information by an infrared ray;

making the second communication terminal inform the terminal address information to the communication server when the infrared ID receiver receives the infrared ray from the infrared ID transmitter and when the second communication terminal obtains the terminal address information; and making the communication server carry out registration of registering the first and the second communication terminals as a single communication terminal having the communication functions for the first and the second media when the communication server is supplied from the second communication terminal with the address of the first communication terminal as the terminal address information.

(7) A communication system comprising:

a first communication terminal provided with an ID reader and having a communication function for a first medium;

a second communication terminal provided with an ID tag and having a communication function for a second medium different from the first medium; and a communication server connected to the first and the second communication terminals;

the ID tag storing terminal address information representative of an address of the second communication terminal;

the first communication terminal informing, when the ID reader reads, as readout address information, the terminal address information from the ID tag of the second communication terminal, the readout address information to the communication server;

the communication server carrying out registration of registering the first and the second communication terminals as a single communication terminal having the communication functions for the first and the second media when the communication server is supplied from the first communication terminal with the address of the second communication terminal as the readout address information.

(8) A communication system comprising:

a first communication terminal provided with an infrared ID receiver and having a communication function for a first medium;

a second communication terminal provided with an infrared ID transmitter and having a communication function for a second medium; and a communication server connected to the first and the second communication terminals;

the infrared ID transmitter storing terminal address information representative of an address of the second communication terminal and transmitting the terminal address information by an infrared ray;

the first communication terminal informing the terminal address information to the communication server when the infrared ID receiver receives the infrared ray from the infrared ID transmitter and when the first communication terminal obtains the terminal address information;

the communication server carrying out registration of registering the first and the second communication terminals as a single communication terminal having the communication functions for the first and the second media when the communication server is supplied from the first communication terminal with the address of the second communication terminal as the terminal address information.

(9) A communication server for use in a communication system which comprises a first communication terminal provided with an ID reader and having a communication function for a first medium and a second communication terminal provided with an ID tag and having a communication function for a second medium different from the first medium, the communication server being connected to the first and the second communication terminals and having a memory, the ID tag storing terminal address information representative of an address of the second communication terminal, the first communication terminal informing, when the ID reader reads, as readout address information, the terminal address information from the ID tag of the second communication terminal, the readout address information to the communication server, wherein:

the communication server has a function of carrying out registration of registering, in the memory, the first and the second communication terminals as a single communication terminal having the communication functions for the first and the second media when the communication server is supplied from the first communication terminal with the address of the second communication terminal as the readout address information.

(10) A communication server for use in a communication system which comprises a first communication terminal provided with an infrared ID receiver and having a communication function for a first medium and a second communication terminal provided with an infrared ID transmitter and having a communication function for a second medium different from the first medium, the communication server being connected to the first and the second communication terminals, the infrared ID transmitter storing terminal address information representative of an address of the second communication terminal and transmitting the terminal address information by an infrared ray, the first communication terminal informing the terminal address information to the communication server when the infrared ID receiver receives the infrared ray from the infrared ID transmitter and when the first communication terminal obtains the terminal address information, wherein:

the communication server has a function of carrying out registration of registering the first and the second communication terminals as a single communication terminal having the communication functions for the first and the second media when the communication server is supplied from the first communication terminal with the address of the second communication terminal as the terminal address information.

(11) A communication method for use in a communication system which comprises a first communication terminal provided with an ID reader and having a communication function for a first medium, a second communication terminal provided with an ID tag and having a communication function for a second medium different from the first medium, and a communication server connected to the first and the second communication terminals, the method comprising the steps of:

preliminarily writing into the ID tag terminal address information representative of an address of the second communication terminal;

making the first communication terminal inform, when the ID reader reads as readout address information the terminal information from the ID tag of the second communication terminal, the readout address information to the communication server;

making the communication server carry out registration of registering the first and the second communication terminals as a single communication terminal having the communication functions for the first and the second media when the communication server is supplied from the first communication terminal with the address of the second communication terminal as the readout address information.

(12) A communication method for use in a communication system which comprises a first communication terminal provided with an infrared ID receiver and having a communication function for a first medium, a second communication terminal provided with an infrared ID transmitter and having a communication function for a second medium different from the first medium, and a communication server connected to the first and the second communication terminals, the method comprising the steps of:

making the infrared ID transmitter memorize terminal address information representative of an address of the second communication terminal;

making the infrared ID transmitter transmit the terminal address information by an infrared ray;

making the first communication terminal inform the terminal address information to the communication server when the infrared ID receiver receives the infrared ray from the infrared ID transmitter and when the second communication terminal obtains the terminal address information; and making the communication server carry out registration of registering the first and the second communication terminals as a single communication terminal having the communication functions for the first and the second media when the communication server is supplied from the first communication terminal with the address of the second communication terminal as the terminal address information.

According to this invention, a first communication terminal having a communication function for a first medium is enabled to perform communication by a plurality of media by the use of a second communication terminal having a communication function for a second medium different from the first medium, even if the first communication terminal does not have the communication function for the second medium.

Further, according to this invention, a first communication terminal having a communication function for a first medium is enabled to perform communication by a plurality of media by the use of a second communication terminal having a communication function for a second medium different from the first medium, even if the first communication terminal does not have the communication function for the second medium, by means of an ID tag attached to or incorporated into one of the first and the second communication terminals and an ID reader attached to or incorporated into the other of the first and the second communication terminals.

Further, according to this invention, in case where the first communication terminal is a portable communication terminal and the second communication terminal is a communication terminal located at a visited place, it is possible to perform communication by a plurality of media by the use of the portable communication terminal and the communication terminal at the visited place.

DESCRIPTION OF THE PREFERRED EMBODIMENT

Figure 1:
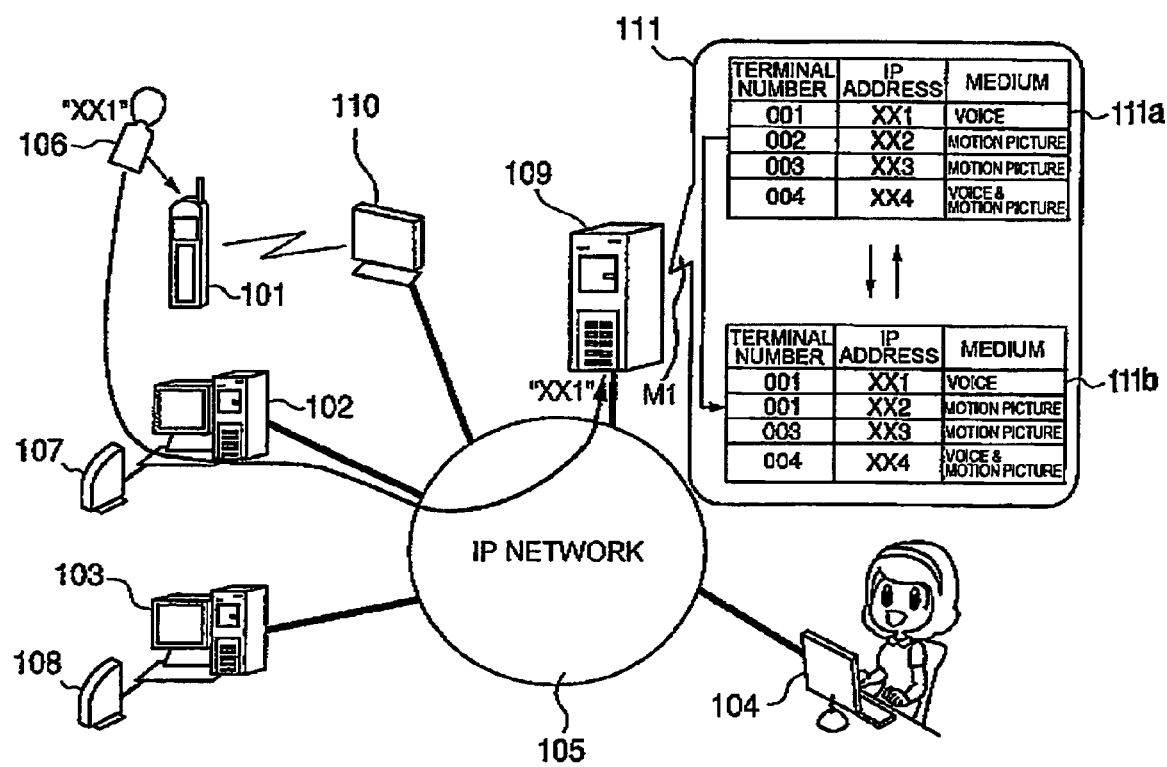
FIG. 1 is a view showing a multimedia communication system for implementing a multimedia communication method according to a first embodiment of this invention.

Now, description will be made of embodiments of this invention with reference to the drawing.

In a multimedia communication method and a multimedia communication system according to this invention, a first communication terminal having a communication function for a first medium is provided with an RFID tag carrying or storing identification information. A second communication terminal having a communication function for a second medium different from the first medium is provided with an RFID reader. The identification information stored in the RFID tag of the first communication terminal is read by the RFID reader of the second communication terminal and notified to a server for administrating communication over an IP network. In this manner, the first communication terminal and the second communication terminal are registered as a single communication terminal having communication functions for the first medium and the second medium. Such registration is cancelled in the similar manner.

Referring to FIG. 1, a multimedia communication system for implementing a multimedia communication method according to a first embodiment of this invention will be described.

In FIG. 1, the multimedia communication system comprises a mobile telephone 101, a PC 102, a PC 103, a PC 104, a communication server 109, and a wireless access point 110. Each of the mobile telephone 101, the PC 102, the PC 103, and the PC 104 serves as a communication terminal.

The mobile telephone 101 is assigned with an IP address "XX1" and connected through the wireless access point 110 to the IP network 105. The mobile telephone 101 has a communication function for voice and is provided with an RFID tag 106.

The PC 102 is assigned with an IP address "XX2" and connected to the IP network 105. The PC 102 has a communication function for motion picture and is provided with an RFID reader 107 connected thereto.

The PC 103 is assigned with an IP address "XX3" and connected to the IP network 105. The PC 103 has a communication function for motion picture and is provided with an RFID reader 108 connected thereto.

The PC 104 is assigned with an IP address "XX4" and connected to the IP network 105. The PC 104 has communication functions for voice and motion picture.

The communication server 109 is connected to the IP network 105 and carries out communication control for the mobile telephone 101, the PC 102, the PC 103, and the PC 104. Typically, the communication server 109 comprises a computer having a memory M1. The memory M1 has an administration table 111.

The communication server 109 administrates terminal numbers, the IP addresses, and communicable media for the mobile telephone 101, the PC 102, the PC 103, and the PC 104 in a setting information table 111a in the administration table 111.

As shown in the setting information table 111a in the administration table 111 in FIG. 1, the mobile telephone 101, the PC 102, the PC 103, and the PC 104 are assigned with the terminal numbers "001", "002", "003", and "004", respectively. These terminal numbers are different from one another.

In the RFID tag 106 of the mobile telephone 101, the IP address "XX1" of the mobile telephone 101 is preliminarily written as RFID information.

Next, an operation of the multimedia communication system in FIG. 1 will be described.

In FIG. 1, the mobile telephone (first communication terminal) 101 has the communication function for voice as a communication function for a first medium. The mobile telephone (first communication terminal) 101 has the RFID tag 106 attached thereto. In the RFID tag 106, the IP address "XX1" of the mobile telephone 101 (first communication terminal) is written as terminal address information representative of an address of the mobile telephone (first communication terminal) 101.

The PC (second communication terminal) 102 has the communication function for motion picture as a communication function for a second medium different from the first medium. The PC (second communication terminal) 102 has the IP address "XX2" as terminal address information representative of an address of the PC (second communication terminal) 102. The PC (second communication terminal) 102 has the RFID reader 107 connected thereto.

The mobile telephone (first communication terminal) 101 is brought close to the PC (second communication terminal) 102 to position the RFID tag 106 in close proximity to the RFID reader 107. Then, the RFID reader 107 reads as readout address information the IP address (terminal address information) "XX1" out of the RFID tag 106 in a non-contact manner. The PC (second communication terminal) 102 having the IP address "XX2" informs the IP address "XX1" (readout address information) of the mobile telephone 101 to the communication server 109 through the IP network 105.

The communication server 109 preliminarily sets and holds, as setting information, the terminal numbers, the IP addresses, and the communicable media (simply referred to as "media" in the figure) in the setting information table 111a in the administration table 111.

In detail, the setting information table 111a memorizes, as the setting information, the IP addresses "XX1", "XX2", "XX3", and "XX4" of the mobile telephone 101, the PC 102, the PC 103, and the PC 104, the communicable media ("voice", "motion picture", "motion picture", and "voice & motion picture") of the mobile telephone 101, the PC 102, the PC 103, and the PC 104 in correspondence to the terminal numbers "001", "002", "003", and "004" of the mobile telephone 101, the PC 102, the PC 103, and the PC 104, respectively.

Supplied from the PC (second communication terminal) 102 having the IP address "XX2") with the IP address "XX1" of the mobile telephone (first communication terminal) 101 as the readout address information, the communication server 109 rewrites the setting information table 111a of the administration table 111 to modify the terminal number "002" of the PC (second communication terminal) 102 having the IP address "XX2" into "001" same as the terminal number of the mobile telephone (first communication terminal) 101. In the above-mentioned manner, the setting information table 111a in the administration table 111 is rewritten into a modified information table 111b.

Thus, supplied from the PC (second communication terminal) 102 with the address "XX1" of the mobile telephone (first communication terminal) 101 as the readout address information, the communication server 109 registers the mobile telephone (first communication terminal) 101 and the PC (second communication terminal) 102 in the administration table 111 of the memory M1 as a single communication terminal having the communication functions for voice (a first medium) and motion picture (a second medium) and assigned with the terminal number "001". The modified information table 111b shows a result of such registration.

Subsequently, according to the modified information table 111b, the communication server 109 identifies the mobile telephone (first communication terminal) 101 and the PC (second communication terminal) 102 as a single communication terminal having the communication functions for voice (a first medium) and motion picture (a second medium) and assigned with the terminal number "001".

As a consequence, the communication server 109 makes it possible to perform communication using voice and motion picture between the PC (a different communication terminal) 104 and a combination of the mobile telephone (first communication terminal) 101 and the PC (second communication terminal) 102.

Further, the mobile telephone (first communication terminal) 101 is again brought close to the RFID reader 107 connected to the PC (second communication terminal) 102. Then, through a process similar to the registration, the communication server 109 rewrites the modified information table 111b in the administration table 111 to return the terminal number "001" of the PC (second communication terminal) 102 having the IP address "XX2" into the original terminal number "002". A state after such rewriting is shown in the setting information table 111a.

In detail, the mobile telephone (first communication terminal) 101 is again brought close to the RFID reader 107 connected to the PC (second communication terminal) 102 so that the RFID reader 107 reads, as readout address information, the IP address (terminal address information) "XX1" from the RFID tag 106 in a non-contact manner. The PC (second communication terminal) 102 having the IP address "XX2" informs the IP address "XX1" (readout address information) of the mobile telephone 101 to the communication server 109 through the IP network 105.

Again supplied from the PC (second communication terminal) 102 having the IP address "XX2" with the IP address "XX1" of the mobile telephone (first communication terminal) 101 as the readout address information, the communication server 109 rewrites the modified information table 111b in the administration table 111 to return the terminal number "001" of the PC (second communication terminal) 102 having the IP address "XX2" into the original terminal number "002" of the PC (second communication terminal) 102. As a consequence, the modified information table 111b is returned into the setting information table 111a.

In the above-mentioned manner, the communication server 109 cancels registration of the mobile telephone (first communication terminal) 101 and the PC (second communication terminal) 102 as a single communication terminal.

As described above, in the multimedia communication method according to the first embodiment of this invention, a user or possessor of the mobile telephone (first communication terminal) 101 can perform communication by a plurality of media by the use of the PC (second communication terminal) 102 at a visited space without carrying his PC.

Thus, in the multimedia communication method according to the first embodiment of this invention, it is possible to perform communication by a plurality of media by the use of the portable communication terminal (101) and the communication terminal (102) at a visited place.

FIG. 1 shows a case where voice and motion picture are used as communication media. However, in addition to the motion picture, use may be made of various media, such as text information, graphics information, and sharing of application software.

Figure 2:
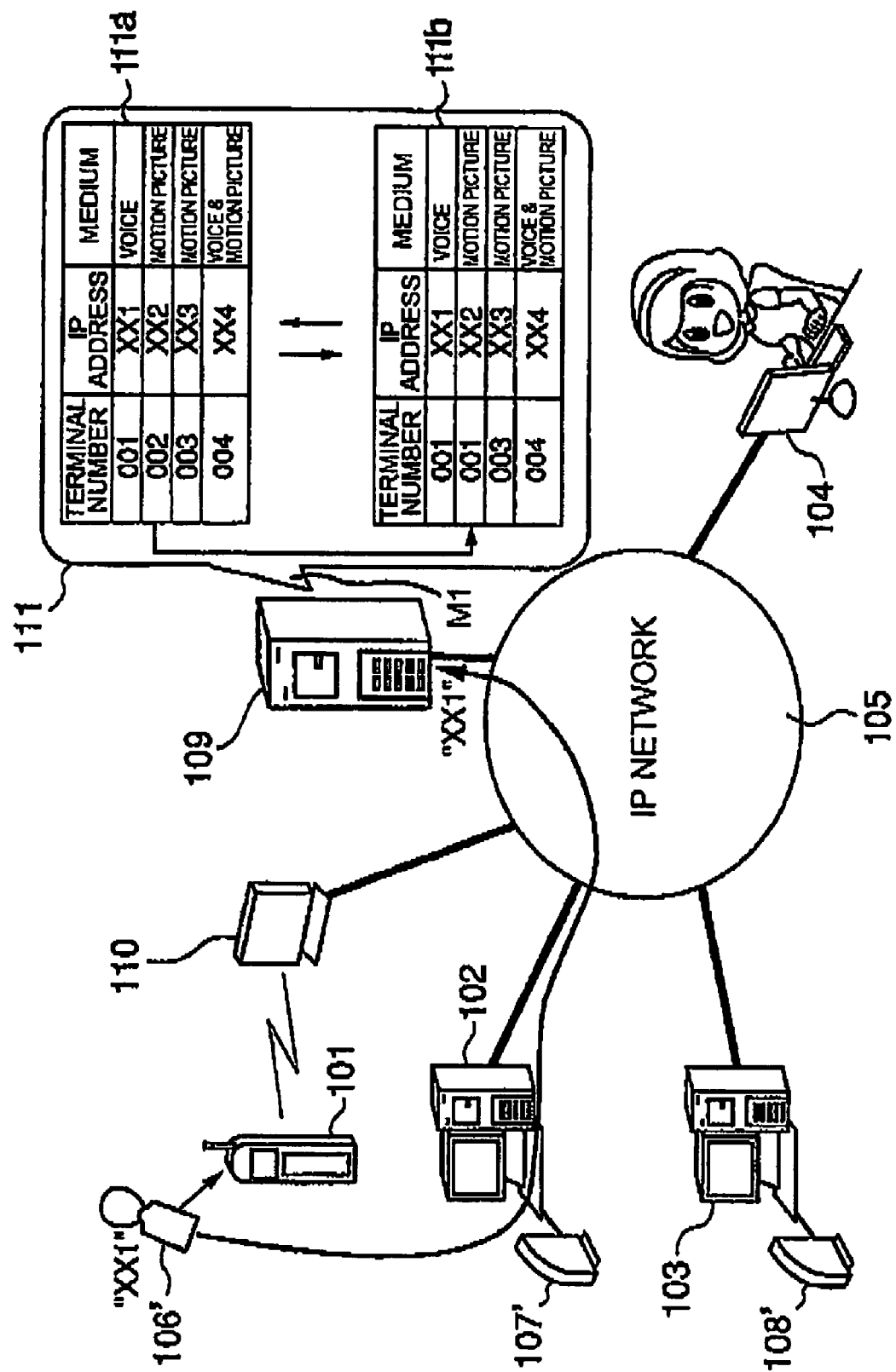
FIG. 2 is a view showing a multimedia communication system for implementing a multimedia communication method according to a second embodiment of this invention.

Referring to FIG. 2, description will be made of a multimedia communication system for implementing a multimedia communication method according to a second embodiment of this invention. The multimedia communication system uses a bar code ID tag 106' carrying or storing bar code ID information instead of the RFID tag 106 (FIG. 1). The bar code ID tag 106' is equipped in or incorporated into the mobile telephone 101. Specifically, the IP address (terminal address information) "XX1" of the mobile telephone (first communication terminal) 101 is written in the bar code ID tag 106' as the bar code ID information. In this case, the PC 102 is provided with a bar code ID reader 107' for optically reading the bar code ID information instead of the RFID reader 107 (FIG. 1). Similarly, the PC 103 is provided with a bar code ID reader 108' instead of the RFID reader 108 (FIG. 1).

Figure 3:
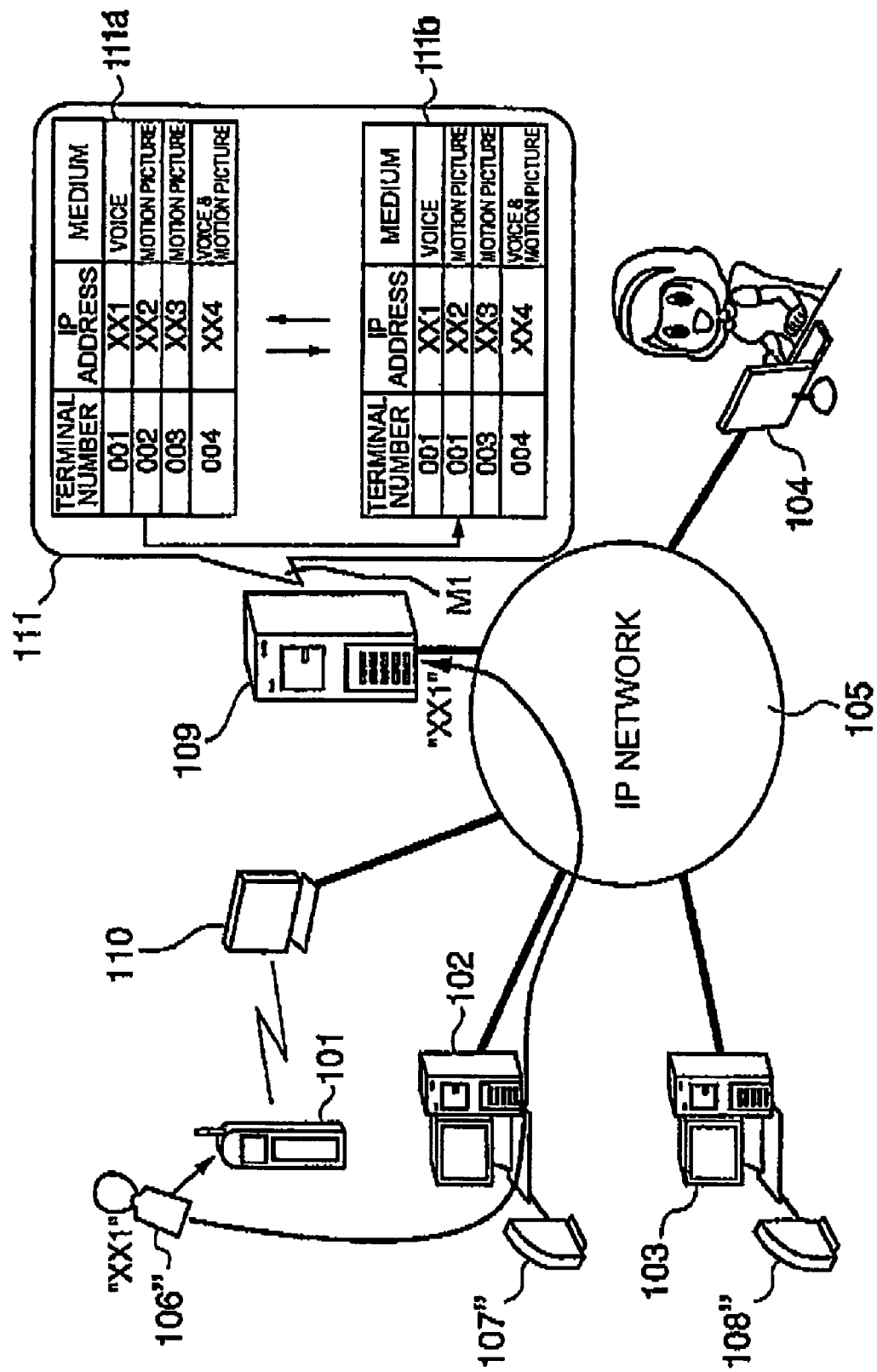
FIG. 3 is a view showing a multimedia communication system for implementing a multimedia communication method according to a third embodiment of this invention.

Referring to FIG. 3, description will be made of a multimedia communication system for implementing a multimedia communication method according to a third embodiment of this invention. The multimedia communication system uses an optical ID tag 106" carrying or storing optical ID information (for example, two-dimensional code ID information) other than the bar code ID information instead of the RFID tag 106 (FIG. 1). The optical ID tag 106" is equipped in the mobile telephone 101. Specifically, the IP address (terminal address information) "XX1" of the mobile telephone (first communication terminal) 101 is written in the optical ID tag 106" as the optical ID information (for example, two-dimensional code ID information). In this case, the PC 102 is provided with an optical ID reader 107" for optically reading the optical ID information (for example, two-dimensional code ID information) instead of the RFID reader 107 (FIG. 1). Similarly, the PC 103 is provided with an optical ID reader 108" instead of the RFID reader 108 (FIG. 1).

Summarizing the multimedia communication systems in FIGS. 1, 2, and 3, the mobile telephone 101 is provided with the ID tag and the PC 102 is provided with the ID reader for reading the ID information (IP address "XX1" of the mobile telephone 101) in the ID tag.

Figure 4:
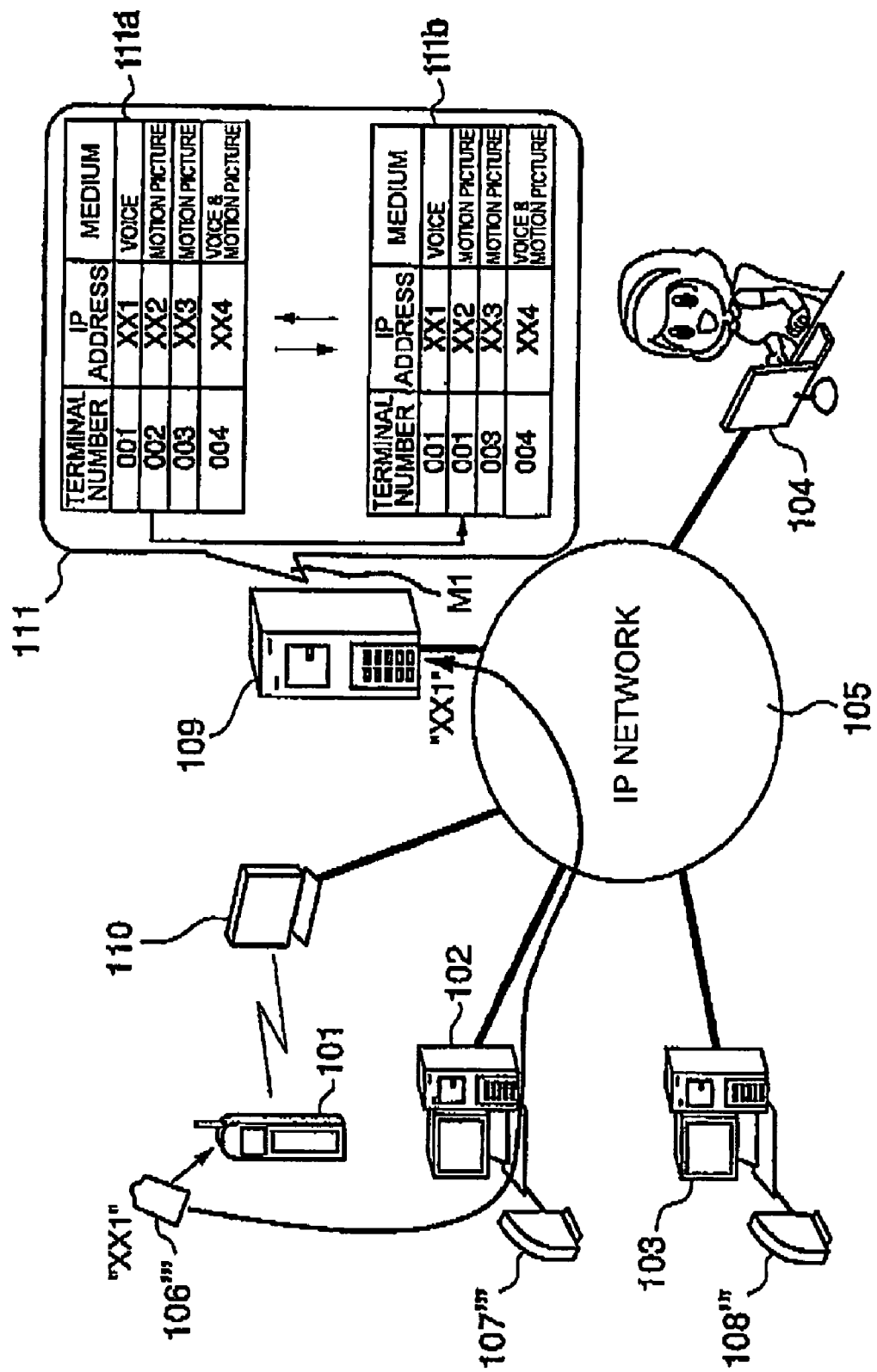
FIG. 4 is a view showing a multimedia communication system for implementing a multimedia communication method according to a fourth embodiment of this invention.

Referring to FIG. 4, description will be made of a multimedia communication system for implementing a multimedia communication method according to a fourth embodiment of this invention. The multimedia communication system uses an infrared ID transmitter 106''' instead of the RFID tag 106 (FIG. 1). The infrared transmitter 106''' is equipped in the mobile telephone 101. The infrared ID transmitter 106''' memorizes the IP address (terminal address information) "XX1" of the mobile telephone (first communication terminal) 101 as ID information and transmits the ID information by an infrared ray. In this case, the PC 102 is provided with an infrared ID receiver 107''' for receiving the infrared ray to obtain the ID information instead of the RFID reader 107 (FIG. 1). Similarly, the PC 103 is provided with an infrared ID receiver 108''' instead of the RFID reader 108 (FIG. 1).

Figure 5:
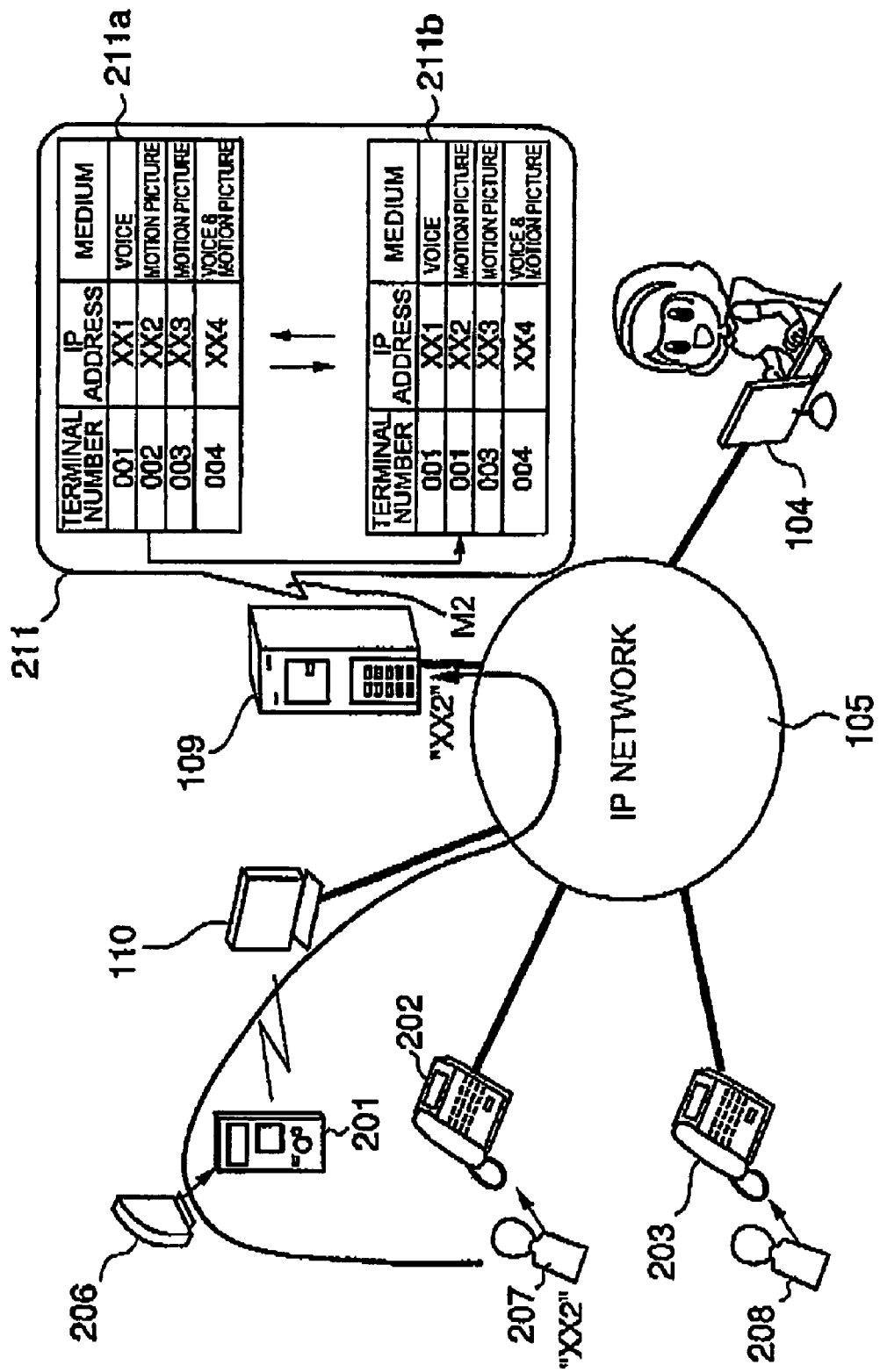
FIG. 5 is a view showing a multimedia communication system for implementing a multimedia communication method according to a fifth embodiment of this invention.

Referring to FIG. 5, description will be made of a multimedia communication system for implementing a multimedia communication method according to a fifth embodiment of this invention.

In FIG. 5, the multimedia communication system comprises a PDA 201, a telephone set 202, a telephone set 203, the PC 104, the communication server 109, and the wireless access point 110. Each of the PDA 201, the telephone set 202, the telephone set 203, and the PC 104 serves as a communication terminal.

The PDA 201 is assigned with the IP address "XX1" and connected through the wireless access point 110 to the IP network 105. The PDA 201 has a communication function for motion picture and is provided with an RFID reader 206. Specifically, the PDA 201 is equipped inside with the RFID reader 206.

The telephone set 202 is assigned with the IP address "XX2" and connected to the IP network 105. The telephone set 202 has a communication function for voice and is provided with an RFID tag 207 connected thereto.

The telephone set 203 is assigned with the IP address "XX3" and connected to the IP network 105. The telephone set 203 has a communication function for voice and is provided with an RFID tag 208 connected thereto.

The PC 104 is assigned with the IP address "XX4" and connected to the IP network 105. The PC 104 has communication functions for voice and motion picture.

The communication server 109 is connected to the IP network 105 and carries out communication control for the PDA 201, the telephone set 202, the telephone set 203, and the PC 104. Typically, the communication server 109 comprises a computer having a memory M2. The memory M2 has an administration table 211.

The communication server 109 administrates terminal numbers, the IP addresses, and communicable media for the PDA 201, the telephone set 202, the telephone set 203, and the PC 104 in a setting information table 211a in the administration table 211.

As shown in the setting information table 211a in the administration table 211 in FIG. 5, the PDA 201, the telephone set 202, the telephone set 203 and the PC 104 are assigned with the terminal numbers "001", "002", "003", and "004", respectively. These terminal numbers are different from one another.

In the RFID tag 207 equipped in the telephone set 202, the IP address "XX2" of the telephone set 202 is preliminarily written as RFID information.

Similarly, in the RFID tag 208 equipped in the telephone set 203, the IP address "XX3" of the telephone set 203 is preliminarily written as RFID information.

Next, an operation of the multimedia communication system in FIG. 5 will be described.

In FIG. 5, the PDA (first communication terminal) 201 has the communication function for motion picture as a communication function for a first medium. The PDA (first communication terminal) 201 has the IP address "XX1" as terminal address information representative of an address of the PDA (the first communication terminal) 201. The PDA (first communication terminal) 201 has the RFID reader 206 equipped inside or incorporated therein.

The telephone set (second communication terminal) 202 has the communication function for voice as a communication function for a second medium. The telephone set (second communication terminal) 202 has the RFID tag 207 attached thereto. In the RFID tag 207, the IP address "XX2" of the telephone set (second communication terminal) 202 is written as terminal address information representative of an address of the telephone set (second communication terminal) 202.

The PDA (first communication terminal) 201 is brought close to the telephone set (second communication terminal) 202 to position the RFID reader 206 in close proximity to the RFID tag 207. Then, the RFID reader 206 reads as readout address information the IP address (terminal address information) "XX2" out of the RFID tag 207 in a non-contact manner. The PDA (first communication terminal) 201 having the IP address "XX1" informs the IP address "XX2" (readout address information) of the telephone set 202 to the communication server 109 through the IP network 105.

The communication server 109 preliminarily sets and holds, as setting information, the terminal numbers, the IP addresses, and the communicable media (simply referred to as "media" in the figure) in the setting information table 211a in the administration table 211.

In detail, the setting information table 211a memorizes, as the setting information, the IP addresses "XX1", "XX2", "XX3", and "XX4" of the PDA 201, the telephone set 202, the telephone set 203, and the PC 104, the communicable media ("motion picture", "voice", "voice", and "voice & motion picture") of the PDA 201, the telephone set 202, the telephone set 203, and the PC 104 in correspondence to the terminal numbers "001", "002", "003", and "004" of the PDA 201, the telephone set 202, the telephone set 203, and the PC 104, respectively.

Supplied from the PDA (first communication terminal) 201 having the IP address "XX1") with the IP address "XX2" of the telephone set (second communication terminal) 202 as the readout address information, the communication server 109 rewrites the setting information table 211a of the administration table 211 to modify the terminal number "002" of the telephone set (second communication terminal) 202 having the IP address "XX2" into "001" same as the terminal number of the PDA (first communication terminal) 201. In the above-mentioned manner, the setting information table 211a in the administration table 211 is rewritten into a modified information table 211b.

Thus, supplied from the PDA (first communication terminal) 201 with the address "XX2" of the mobile telephone (second communication terminal) 202 as the readout address information, the communication server 109 registers the PDA (first communication terminal) 201 and the telephone set (second communication terminal) 202 in the administration table 211 of the memory M2 as a single communication terminal having the communication functions for motion picture (a first medium) and voice (a second medium) and assigned with the terminal number "001". The modified information table 211b shows a result of such registration.

Subsequently, according to the modified information table 211b, the communication server 109 identifies the PDA (first communication terminal) 201 and the telephone set (second communication terminal) 202 as a single communication terminal having the communication functions for motion picture (first medium) and voice (a second medium) and assigned with the terminal number "001".

As a consequence, the communication server 109 makes it possible to perform communication using motion picture and voice between the PC (a different communication terminal) 104 and a combination of the PDA (first communication terminal) 201 and the telephone set (second communication terminal) 202.

Further, the PDA (first communication terminal) 201 is again brought close to the RFID tag 207 attached to the telephone set (second communication terminal) 202. Then, through a process similar to the registration, the communication server 109 rewrites the modified information table 211b in the administration table 211 to return the terminal number "001" of the telephone set (second communication terminal) 202 having the IP address "XX2" into the original terminal number "002". A state after such rewriting is shown in the setting information table 211a.

In detail, the PDA (first communication terminal) 201 is again brought close to the RFID tag 207 attached to the telephone set (second communication terminal) 202 so that the RFID reader 206 reads, as the readout address information, the IP address (terminal address information) "XX2" from the RFID tag 207 in a non-contact manner. The PDA (first communication terminal) 201 having the IP address "XX1" informs the IP address "XX2" (readout address information) of the telephone set 202 to the communication server 109 through the IP network 105.

Again supplied from the PDA (first communication terminal) 201 having the IP address "XX1" with the IP address "XX2" of the telephone set (second communication terminal) 202 as the readout address information, the communication server 109 rewrites the modified information table 211b in the administration table 211 to return the terminal number "001" of the telephone set (second communication terminal) 202 having the IP address "XX2" into the terminal number "002" of the telephone set (second communication terminal) 202. As a consequence, the modified information table 211b is returned into the setting information table 211a.

In the above-mentioned manner, the communication server 109 cancels registration of the PDA (first communication terminal) 201 and the telephone set (second communication terminal) 202 as a single communication terminal.

As described above, in the multimedia communication method according to the second embodiment of this invention, a user or possessor of the PDA (first communication terminal) 201 can perform communication by a plurality of media by the use of the telephone set (second communication terminal) 202 at a visited space.

Thus, in the multimedia communication method according to the second embodiment of this invention, it is possible to perform communication by a plurality of media by the use of the portable communication terminal (201) and the communication terminal (202) at a visited place.

FIG. 5 shows a case where voice and motion picture are used as communication media, However, in addition to the motion picture, use may be made of various media, such as text information, graphics information, and sharing of application software.

Figure 6:
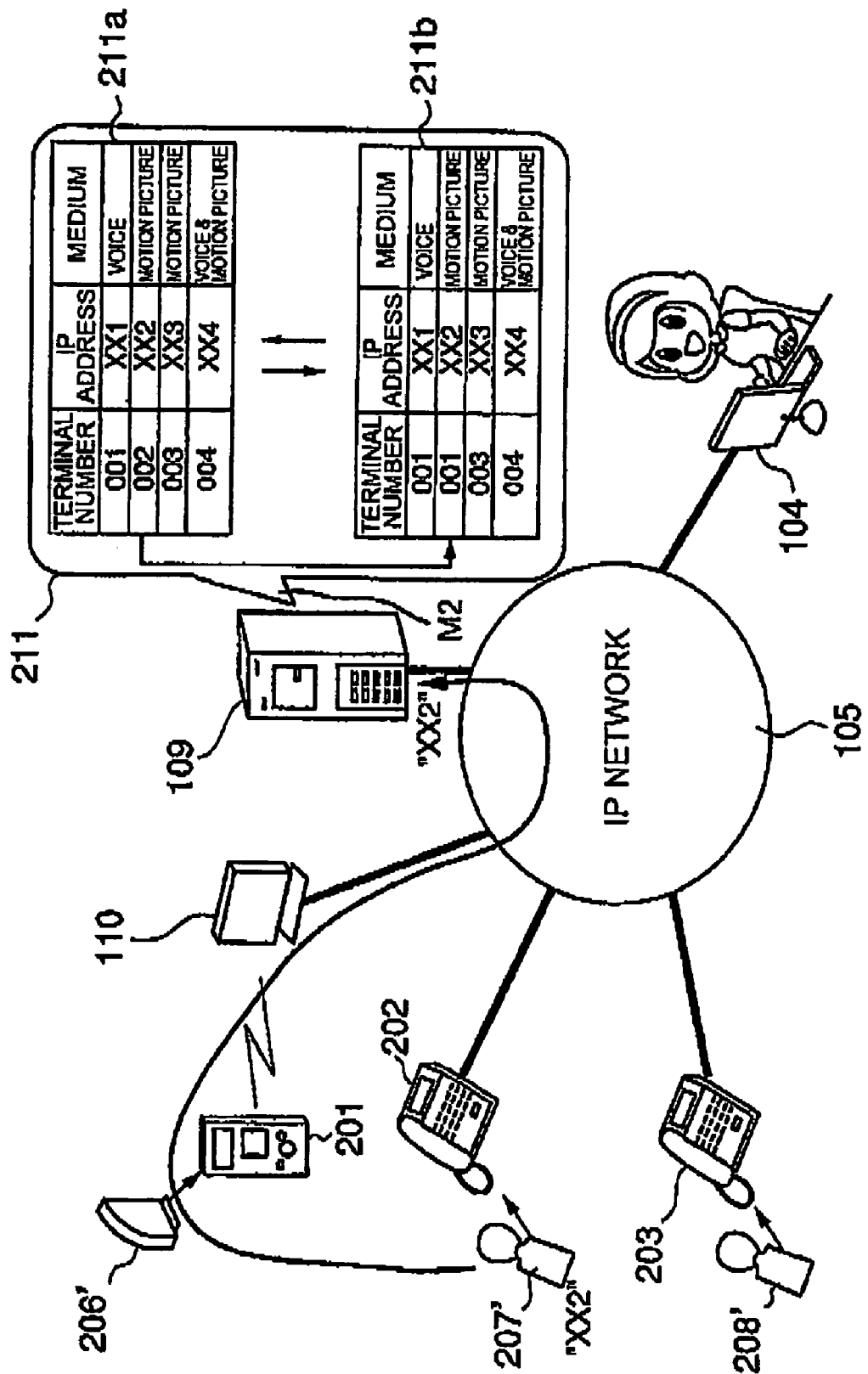
FIG. 6 is a view showing a multimedia communication system for implementing a multimedia communication method according to a sixth embodiment of this invention.

Referring to FIG. 6, description will be made of a multimedia communication system for implementing a multimedia communication method according to a sixth embodiment of this invention. The multimedia communication system uses a bar code ID tag 207' carrying or storing bar code ID information instead of the RFID tag 207 (FIG. 5). The bar code ID tag 207' is equipped in the telephone set 202. Specifically, the IP address (terminal address information) "XX2" of the telephone set (second communication terminal) 202 is written in the bar code ID tag 207' as the bar code ID information. In this case, the PDA 201 is provided with a bar code ID reader 206' for optically reading the bar code ID information instead of the RFID reader 206 (FIG. 5). The telephone set 203 is provided with a bar code ID tag 208' instead of the RFID tag 208 (FIG. 5). In the bar code ID tag 208', the IP address "XX3" of the telephone set 203 is written.

Figure 7:
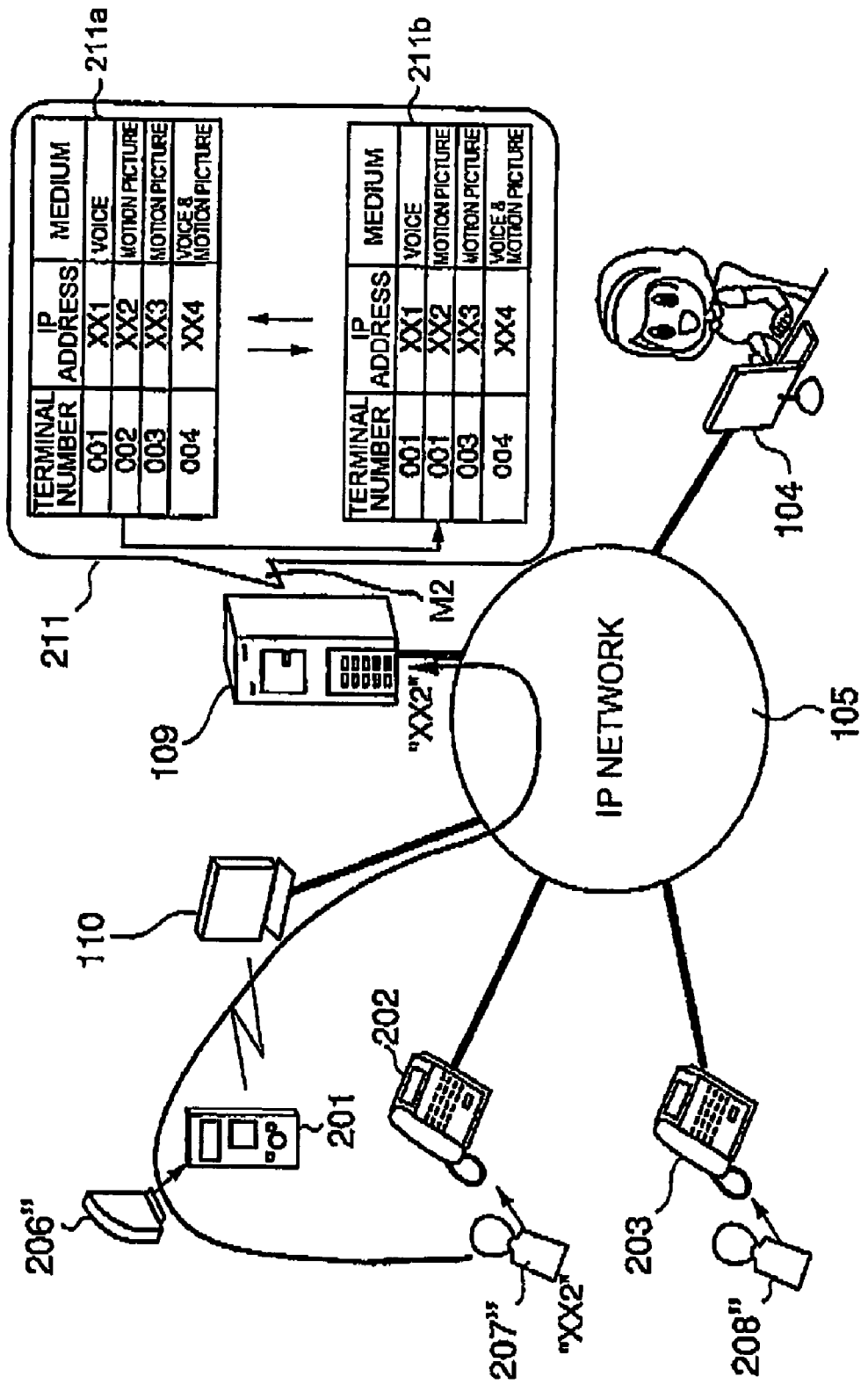
FIG. 7 is a view showing a multimedia communication system for implementing a multimedia communication method according to a seventh embodiment of this invention.

Referring to FIG. 7, description will be made of a multimedia communication system for implementing a multimedia communication method according to a seventh embodiment of this invention. The multimedia communication system uses an optical ID tag 207" carrying or storing optical ID information (for example, two-dimensional code ID information) other than the bar code ID information instead of the RFID tag 207 (FIG. 5). The optical ID tag 207" is equipped in the telephone set 202. Specifically, the IP address (terminal address information) "XX2" of the telephone set (second communication terminal) 202 is written in the optical ID tag 207" as the optical ID information (for example, two-dimensional code ID information). In this case, the PDA 201 is provided with an optical ID reader 206" for optically reading the optical ID information (for example, two-dimensional code ID information) instead of the RFID reader 206 (FIG. 5). The telephone set 203 is provided with an optical ID tag 208" instead of the RFID tag 208 (FIG. 5). In the optical ID tag 208", the IP address "XX3" of the telephone set 203 is written.

Summarizing the multimedia communication systems in FIGS. 5, 6, and 7, the telephone set 202 is provided with the ID tag and the PDA 201 is provided with the ID reader for reading the ID information (IP address "XX2" of the telephone set 202) in the ID tag.

Figure 8:
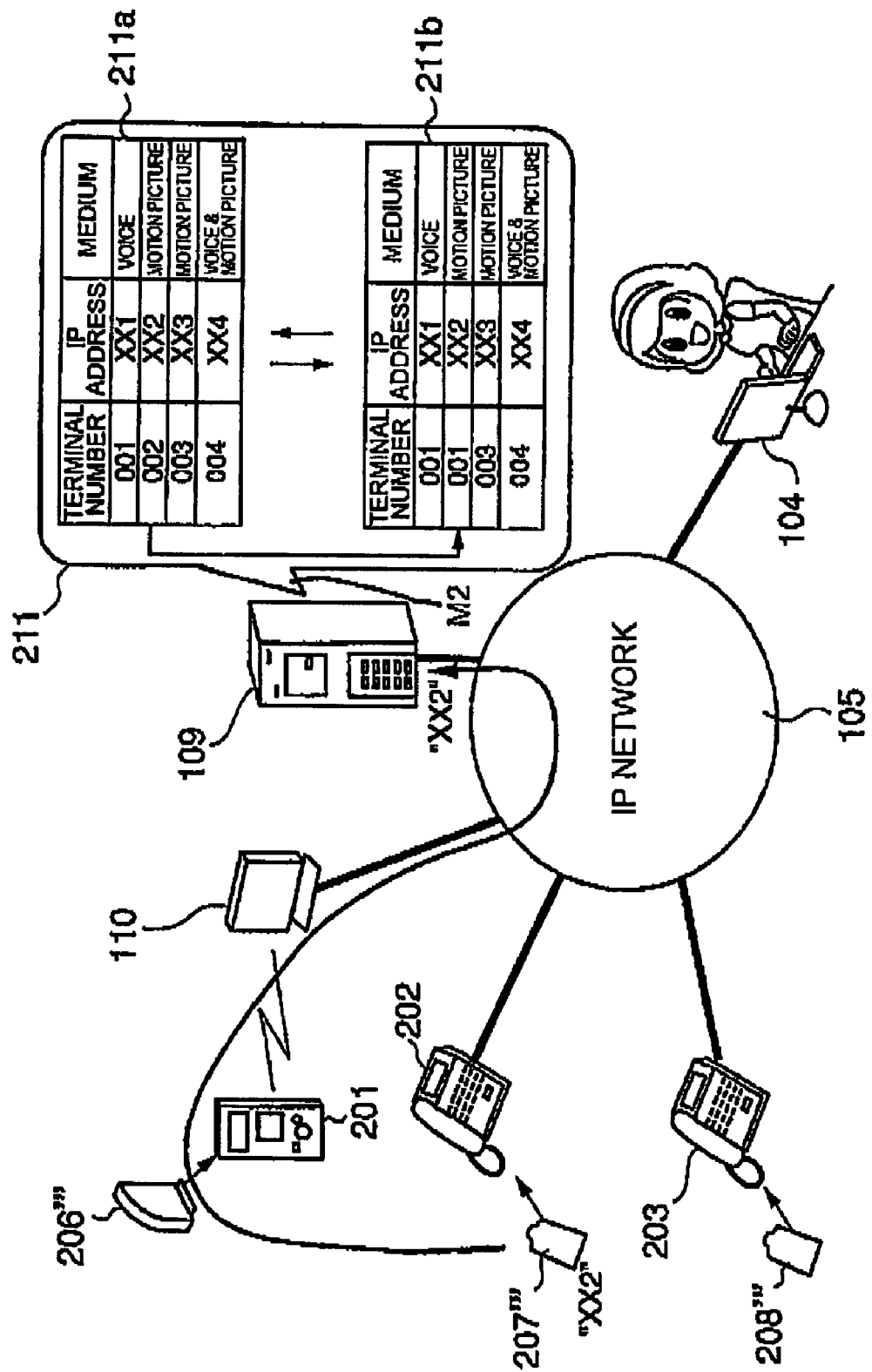
FIG. 8 is a view showing a multimedia communication system for implementing a multimedia communication method according to an eighth embodiment of this invention.

Referring to FIG. 8, description will be made of a multimedia communication system for implementing a multimedia communication method according to an eighth embodiment of this invention. The multimedia communication system uses an infrared ID transmitter 207''' instead of the RFID tag 207 (FIG. 5). The infrared transmitter 207''' is equipped in the telephone set 202. The infrared ID transmitter 207''' memorizes the IP address (terminal address information) "XX2" of the telephone set (second communication terminal) 202 as ID information and transmits the ID information by an infrared ray. In this case, the PDA 201 is provided with an infrared ID receiver 206''' for receiving the infrared ray to obtain the ID information instead of the RFID reader 206 (FIG. 5). The telephone set 203 is provided with an infrared ID transmitter 208''' instead of the RFID tag 208 (FIG. 5). The infrared ID transmitter 208''' memorizes the IP address "XX3" of the telephone set 203 as the ID information and transmits the ID information by an infrared ray.

Although this invention has thus far been described in conjunction with the preferred embodiments thereof, it will readily be possible for those skilled in the art to put this invention into practice in various other manners without departing the scope of the appended claims.

What is claimed is:

1. A communication system comprising:
a first communication terminal provided with an ID tag and having a communication function for a first medium;
a second communication terminal provided with an ID reader and having a communication function for a second medium different from the first medium; and
a communication server connected to said first and said second communication terminals;
said ID tag storing terminal address information representative of an address of said first communication terminal,
said second communication terminal informing, when said ID reader reads, as readout address information, the terminal address information from the ID tag of said first communication terminal, the readout address information to said communication server,
said communication server carrying out registration of registering said first and said second communication terminals as a single communication terminal having the communication functions for said first and said second media when said communication server is supplied from said second communication terminal with the address of said first communication terminal as said readout address information, said communication server has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said second communication terminal with the address of said first communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

2. The communication system as claimed in claim 1, further comprising:
   a different communication terminal connected to said communication server and having communication functions for said first and second media;
   said communication server identifying, after said registration, said first and said second communication terminals as a single communication terminal having the communication functions for said first and said second media and assigned with the terminal number of said first communication terminal so that said communication server makes it possible to perform communication using said first and said second media between a combination of said first and said second communication terminals and said different communication terminal.

3. The communication system as claimed in claim 1, wherein:
   said communication server cancels, when said communication server is again supplied from said second communication terminal with the address of said first communication terminal as said readout address information, the registration of said first and said second communication terminals as a single communication terminal.

4. The communication system as claimed in claim 1, wherein:
   said communication server rewrites, when said communication server is again supplied from said second communication terminal with the address of said first communication terminal as said readout address information, the terminal number of said second communication terminal in said administration table into the terminal number of said second communication terminal so that said communication server cancels the registration of said first and said second communication terminals as a single communication terminal.

5. The communication system as claimed in claim 1, wherein:
   said ID tag is an RFID tag with said terminal address information written therein;
   said ID reader being an RFID reader for reading said terminal address information from said RFID tag.

6. The communication system as claimed in claim 1, wherein:
   said ID tag is a bar code ID tag with said terminal address information written therein;
   said ID reader being a bar code ID reader for reading said terminal address information from said bar code ID tag.

7. The communication system as claimed in claim 1, wherein:
   said ID tag is an optical ID tag with said terminal address information written therein;
   said ID reader being an optical ID reader for reading said terminal address information from said optical ID tag.

8. A communication system comprising:
   a first communication terminal provided with an infrared ID transmitter and having a communication function for a first medium;
   a second communication terminal provided with an infrared ID receiver and having a communication function for a second medium; and
   a communication server connected to said first and said second communication terminals;
   said infrared ID transmitter storing terminal address information representative of an address of said first communication terminal and transmitting said terminal address information by an infrared ray;
   said second communication terminal informing said terminal address information to said communication server when said infrared ID receiver receives the infrared ray from said infrared ID transmitter and when said second communication terminal obtains said terminal address information;
   said communication server carrying out registration of registering said first and said second communication terminals as a single communication terminal having the communication functions for said first and said second media when said communication server is supplied from said second communication terminal with the address of said first communication terminal as said terminal address information.

9. A communication server for use in a communication system which comprises a first communication terminal provided with an ID tag and having a communication function for a first medium and a second communication terminal provided with an ID reader and having a communication function for a second medium different from said first medium, said communication server being connected to said first and said second communication terminals and having a memory, said ID tag storing terminal address information representative of an address of said first communication terminal, said second communication terminal informing, when said ID reader reads, as readout address information, the terminal address information from the ID tag of said first communication terminal, the readout address information to said communication server, wherein:
   said communication server has a function of carrying out registration of registering, in said memory, said first and said second communication terminals as a single communication terminal having the communication functions for said first and said second media when said communication server is supplied from said second communication terminal with the address of said first communication terminal as said readout address information,
   said memory has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said second communication terminal with the address of said first communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

10. The communication server as claimed in claim 9, wherein:

said communication system further comprises a different communication terminal connected to said communication server and having communication functions for said first and second media;

said communication server identifying, after said registration, said first and said second communication terminals as a single communication terminal having the communication functions for said first and said second media and assigned with the terminal number of said first communication terminal so that said communication server makes it possible to perform communication using said first and said second media between a combination of said first and said second communication terminals and said different communication terminal.

11. The communication server as claimed in claim 9, wherein:

said communication server cancels, when said communication server is again supplied from said second communication terminal with the address of said first communication terminal as said readout address information, the registration of said first and said second communication terminals as a single communication terminal.

12. The communication server as claimed in claim 9, wherein:

said communication server rewrites, when said communication server is again supplied from said second communication terminal with the address of said first communication terminal as said readout address information, the terminal number of said second communication terminal in said administration table into the terminal number of said second communication terminal so that said communication server cancels the registration of said first and said second communication terminals as a single communication terminal.

13. A communication server for use in a communication system which comprises a first communication terminal provided with an infrared ID transmitter and having a communication function for a first medium and a second communication terminal provided with an infrared ID receiver and having a communication function for a second medium different from said first medium, said communication server being connected to said first and said second communication terminals, said infrared ID transmitter storing terminal address information representative of an address of said first communication terminal and transmitting said terminal address information by an infrared ray, said second communication terminal informing said terminal address information to said communication server when said infrared ID receiver receives the infrared ray from said infrared ID transmitter and when said second communication terminal obtains said terminal address information, wherein:

said communication server has a function of carrying out registration of registering said first and said second communication terminals as a single communication terminal having the communication functions for said first and said second media when said communication server is supplied from said second communication terminal with the address of said first communication terminal as said terminal address information.

14. A communication method for use in a communication system which comprises a first communication terminal provided with an ID tag and having a communication function for a first medium, a second communication terminal provided with an ID reader and having a communication function for a second medium different from the first medium, and a communication server connected to said first and said second communication terminals, said method comprising the steps of:

preliminarily writing into said ID tag terminal address information representative of an address of said first communication terminal;

making said second communication terminal inform, when said ID reader reads as readout address information the terminal information from the ID tag of said first communication terminal, the readout address information to said communication server; and making said communication server carry out registration of registering said first and said second communication terminals as a single communication terminal having the communication functions for said first and said second media when said communication server is supplied from said second communication terminal with the address of said first communication terminal as said readout address information, wherein said communication server has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said second communication terminal with the address of said first communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

15. A communication method for use in a communication system which comprises a first communication terminal provided with an infrared ID transmitter and having a communication function for a first medium, a second communication terminal provided with an infrared ID receiver and having a communication function for a second medium different from said first medium, and a communication server connected to said first and said second communication terminals, said method comprising the steps of:

making said infrared ID transmitter memorize terminal address information representative of an address of said first communication terminal;

making said infrared ID transmitter transmit said terminal address information by an infrared ray;

making said second communication terminal inform said terminal address information to said communication server when said infrared ID receiver receives the infrared ray from said infrared ID transmitter and when said second communication terminal obtains said terminal address information; and making said communication server carry out registration of registering said first and said second communication terminals as a single communication terminal having the communication functions for said first and said second media when said communication server is supplied from said second communication terminal with the address of said first communication terminal as said terminal address information.

16. TA communication system comprising:

a first communication terminal provided with an ID reader and having a communication function for a first medium;

a second communication terminal provided with an ID tag and having a communication function for a second medium different from the first medium; and a communication server connected to said first and said second communication terminals;

said ID tag storing terminal address information representative of an address of said second communication terminal, said first communication terminal informing, when said ID reader reads, as readout address information, the terminal address information from the ID tag of said second communication terminal, the readout address information to said communication server, said communication server carrying out registration of registering said first and said second communication terminals as a single communication terminal having the communication functions for said first and said second media when said communication server is supplied from said first communication terminal with the address of said second communication terminal as said readout address information, said communication server has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said first communication terminal with the address of said second communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

17. The communication system as claimed in claim 16, further comprising:

a different communication terminal connected to said communication server and having communication functions for said first and second media;

said communication server identifying, after said registration, said first and said second communication terminals as a single communication terminal having the communication functions for said first and said second media and assigned with the terminal number of said first communication terminal so that said communication server makes it possible to perform communication using said first and said second media between a combination of said first and said second communication terminals and said different communication terminal.

18. The communication system as claimed in claim 16, wherein:

said communication server cancels, when said communication server is again supplied from said first communication terminal with the address of said second communication terminal as said readout address information, the registration of said first and said second communication terminals as a single communication terminal.

19. The communication system as claimed in claim 16, wherein:

said communication server rewrites, when said communication server is again supplied from said first communication terminal with the address of said second communication terminal as said readout address information, the terminal number of said second communication terminal in said administration table into the terminal number of said second communication terminal so that said communication server cancels the registration of said first and said second communication terminals as a single communication terminal.

20. The communication system as claimed in claim 16, wherein:

said ID tag is an RFID tag with said terminal address information written therein;

said ID reader being an RFID reader for reading said terminal address information from said RFID tag.

21. The communication system as claimed in claim 16, wherein:

said ID tag is a bar code ID tag with said terminal address information written therein;

said ID reader being a bar code ID reader for reading said terminal address information from said bar code ID tag.

22. The communication system as claimed in claim 16, wherein:

said ID tag is an optical ID tag with said terminal address information written therein;

said ID reader being an optical ID reader for reading said terminal address information from said optical ID tag.

23. A communication system comprising:

a first communication terminal provided with an infrared ID receiver and having a communication function for a first medium;

a second communication terminal provided with an infrared ID transmitter and having a communication function for a second medium; and a communication server connected to said first and said second communication terminals;

said infrared ID transmitter storing terminal address information representative of an address of said second communication terminal and transmitting said terminal address information by an infrared ray;

said first communication terminal informing said terminal address information to said communication server when said infrared ID receiver receives the infrared ray from said infrared ID transmitter and when said first communication terminal obtains said terminal address information;

said communication server carrying out registration of registering said first and said second communication terminals as a single communication terminal having the communication functions for said first and said second media when said communication server is supplied from said first communication terminal with the address of said second communication terminal as said terminal address information.

24. A communication server for use in a communication system which comprises a first communication terminal provided with an ID reader and having a communication function for a first medium and a second communication terminal provided with an ID tag and having a communication function for a second medium different from said first medium, said communication server being connected to said first and said second communication terminals and having a memory, said ID tag storing terminal address information representative of an address of said second communication terminal, said first communication terminal informing, when said ID reader reads, as readout address information, the terminal address information from the ID tag of said second communication terminal, the readout address information to said communication server, wherein said communication server has a function of carrying out registration of registering, in said memory, said first and said second communication terminals as a single communication terminal having the communication functions for said first and said second media when said communication server is supplied from said first communication terminal with the address of said second communication terminal as said readout address information, said memory has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said first communication terminal with the address of said second communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

25. The communication server as claimed in claim 24, wherein:

said communication system further comprises a different communication terminal connected to said communication server and having communication functions for said first and second media;

said communication server identifying, after said registration, said first and said second communication terminals as a single communication terminal having the communication functions for said first and said second media and assigned with the terminal number of said first communication terminal so that said communication server makes it possible to perform communication using said first and said second media between a combination of said first and said second communication terminals and said different communication terminal.

26. The communication server as claimed in claim 24, wherein:

said communication server cancels, when said communication server is again supplied from said first communication terminal with the address of said second communication terminal as said readout address information, the registration of said first and said second communication terminals as a single communication terminal.

27. The communication server as claimed in claim 24, wherein:

said communication server rewrites, when said communication server is again supplied from said first communication terminal with the address of said second communication terminal as said readout address information, the terminal number of said second communication terminal in said administration table into the terminal number of said second communication terminal so that said communication server cancels the registration of said first and said second communication terminals as a single communication terminal.

28. A communication server for use in a communication system which comprises a first communication terminal provided with an infrared ID receiver and having a communication function for a first medium and a second communication terminal provided with an infrared ID transmitter and having a communication function for a second medium different from said first medium, said communication server being connected to said first and said second communication terminals, said infrared ID transmitter storing terminal address information representative of an address of said second communication terminal and transmitting said terminal address information by an infrared ray, said first communication terminal informing said terminal address information to said communication server when said infrared ID receiver receives the infrared ray from said infrared ID transmitter and when said first communication terminal obtains said terminal address information, wherein:

said communication server has a function of carrying out registration of registering said first and said second communication terminals as a single communication terminal having the communication functions for said first and said second media when said communication server is supplied from said first communication terminal with the address of said second communication terminal as said terminal address information.

29. A communication method for use in a communication system which comprises a first communication terminal provided with an ID reader and having a communication function for a first medium, a second communication terminal provided with an ID tag and having a communication function for a second medium different from the first medium, and a communication server connected to said first and said second communication terminals, said method comprising the steps of:

preliminarily writing into said ID tag terminal address information representative of an address of said second communication terminal;

making said first communication terminal inform, when said ID reader reads as readout address information the terminal information from the ID tag of said second communication terminal, the readout address information to said communication server; and making said communication server carry out registration of registering said first and said second communication terminals as a single communication terminal having the communication functions for said first and said second media when said communication server is supplied from said first communication terminal with the address of said second communication terminal as said readout address information, wherein said communication server has an administration table which preliminarily memorizes, as setting information, terminal numbers of said first and said second communication terminals and, in correspondence to the terminal numbers of said first and said second communication terminals, addresses of said first and said second communication terminals and said first and said second media as communicable media of said first and said second communication terminals, and said communication server rewriting, when said communication server is supplied from said second communication terminal with the address of said first communication terminal as said readout address information, the terminal number of said second communication terminal in said administration table into a number same as the terminal number of said first communication terminal so that said communication server carries out the registration of registering said first and said second communication terminals as a single communication terminal having the communication functions for said first and said second media.

30. A communication method for use in a communication system which comprises a first communication terminal provided with an infrared ID receiver and having a communication function for a first medium, a second communication terminal provided with an infrared ID transmitter and having a communication function for a second medium different from said first medium, and a communication server connected to said first and said second communication terminals, said method comprising the steps of:

making said infrared ID transmitter memorize terminal address information representative of an address of said second communication terminal;

making said infrared ID transmitter transmit said terminal address information by an infrared ray;

making said first communication terminal inform said terminal address information to said communication server when said infrared ID receiver receives the infrared ray from said infrared ID transmitter and when said second communication terminal obtains said terminal address information; and making said communication server carry out registration of registering said first and said second communication terminals as a single communication terminal having the communication functions for said first and said second media when said communication server is supplied from said first communication terminal with the address of said second communication terminal as said terminal address information.

* * * * *